Jan. 6, 1931.                R. S. BLAIR                1,787,434
               CONTROLLING SYSTEM FOR HEATING AGENCIES
                        Filed May 9, 1927

INVENTOR
Robert S. Blair

Patented Jan. 6, 1931

1,787,434

UNITED STATES PATENT OFFICE

ROBERT S. BLAIR, OF STAMFORD, CONNECTICUT

CONTROLLING SYSTEM FOR HEATING AGENCIES

Application filed May 9, 1927. Serial No. 189,921.

This invention relates to controlling systems for heating agencies and, more particularly, to a system of such nature whereby the fuel or fuels are economized.

One of the objects thereof is to provide a system of the above nature of simple and practical construction and reliable action. Another object is to provide a system of the above nature which shall be automatic in action and perform its functions in an efficient manner. Other objects will be in part obvious and in part pointed out hereinafter.

The invention accordingly consists in the features of construction, combinations of elements and arrangements of parts which will be exemplified in the construction hereinafter described and the scope of the application of which will be indicated in the following claims.

Figure 1:
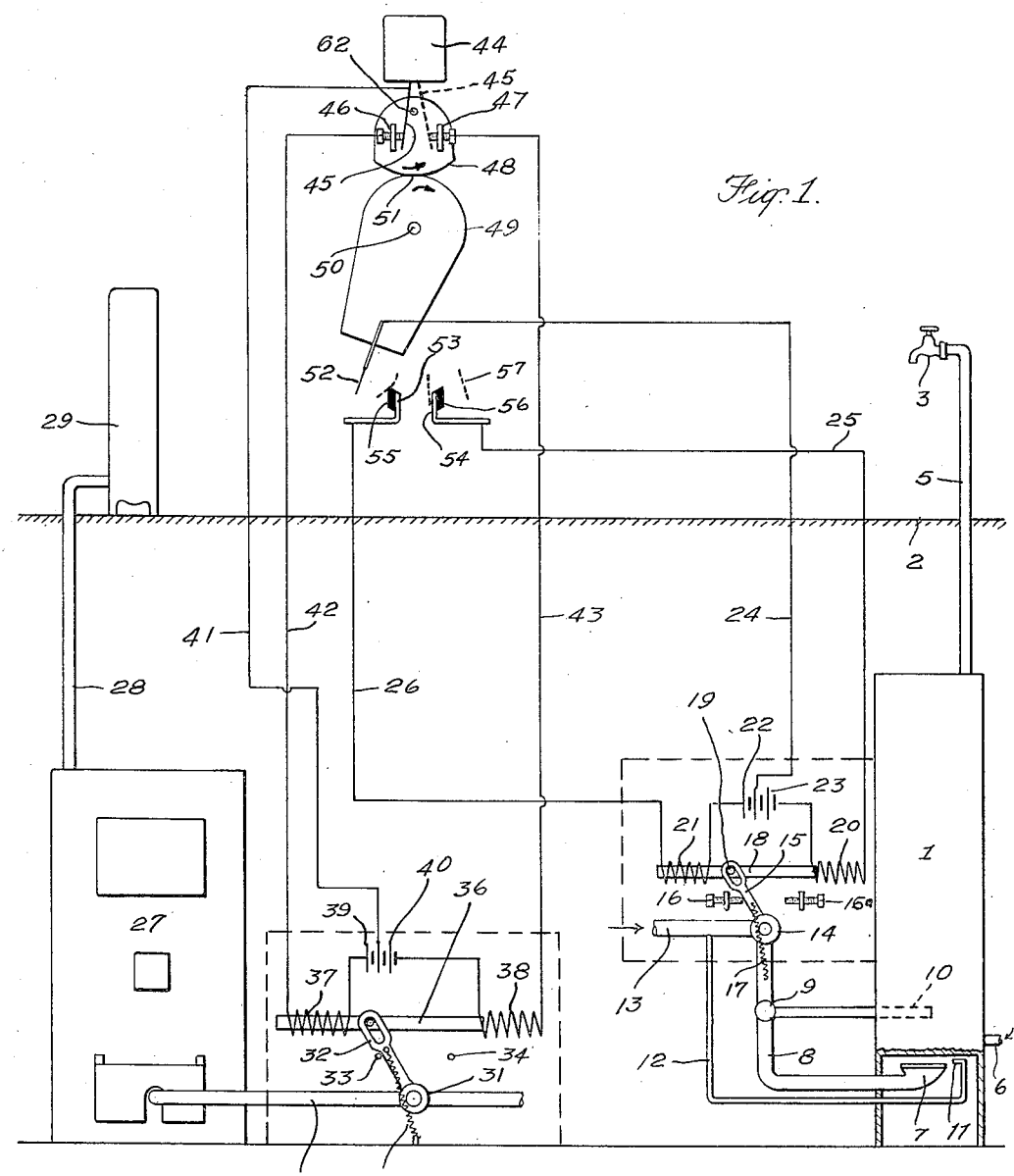
Figure 2:
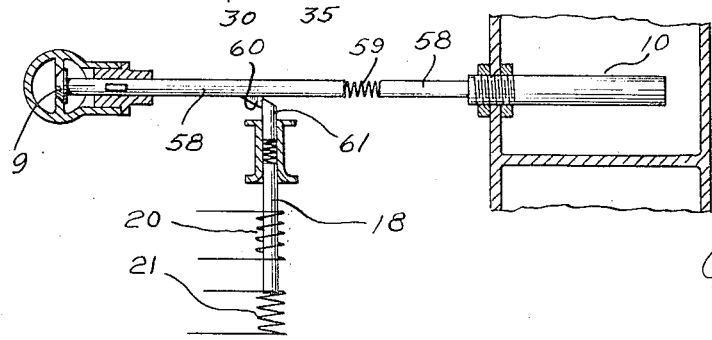

In the accompanying drawing, in which is shown one or more of various possible embodiments of the several features of this invention, Figure 1 is a diagrammatic elevation; and Fig. 2 is a sectional detailed view of a modification of a portion of the apparatus of Fig. 1.

Similar reference characters refer to similar parts throughout both views of the drawing.

Referring now to Fig. 1 of the drawings, there is shown at 1 the tank of an automatic hot water heating system which supplies hot water to the interior of a building the floor of which is indicated at 2. At 3 is diagrammatically indicated faucets or other water-utilizing devices connected with the tank 1 as by the pipe 5 and the water inlet as indicated at 6.

This tank is heated as by a large gas-jet 7 supplied by a conduit 8 having therein a valve 9 automatically controlled by a thermostat 10 responsive to the temperature of the water in the tank. A suitable pilot burner 11 is supplied by a branch pipe 12 from the main gas supply conduit 13. The pilot burner is continuously burning and when the water drops below a predetermined temperature the thermostat 10 opens the main gas valve 9, thus permitting the burner 7 to discharge gas which is ignited by the pilot. This brings the water again up to the desired temperature, whereupon the thermostat acts to close the valve 9.

A valve 14 is interposed in the pipe 8, supplying the burner 7, in series with the valve 9. This valve 14 is actuated by an arm 15, the valve being open when the arm is in the position shown in full lines resting against an adjustable stop 16. It is resiliently held in this position by a tension spring 17, but if the arm 15 be swung to the right, having reference to Fig. 1 of the drawing, into engagement with the adjustable stop 16ª, then the spring 17, having passed to the other side of the axis of the arm 15, will tend to hold the latter up against this stop, in which position the valve 14 is closed.

A core member 18 is mounted to slide longitudinally and has a connection by means of the pin 19 with a slot in the end of the arm 15. Accordingly, when this core slides in one or the other direction, it swings the arm 15 and opens or shuts the valve 14. Core 18 coacts with solenoids 20 and 21 and is moved in one or the other direction according to whichever of these solenoids is energized. Solenoid 21 is connected in series with a battery section 22, and solenoid 20 is likewise in series with a battery section 23, a common connection 24 leading from these battery sections. The remaining ends of solenoids 20 and 21 are connected with conductors 25 and 26, respectively, and it will thus be seen that solenoids 20 and 21 will be respectively energized according as the conductor 24 is brought into electrical connection with conductors 25 and 26.

Still referring to Fig. 1 of the drawings, there is shown at 27 a house heater of any desired type which, by suitable connections 28, supplies a heating fluid to the heating apparatus diagrammatically indicated at 29 in the room above the floor 2. The action of this heater 27 is controlled by any suitable means; for the sake of simplicity we can assume it to be an oil heater supplied by the conduit 30 having positioned therein a controlling valve 31. The latter valve is actuated by an arm 32; and when this arm rests against the stop 33 the heater 27 is turned on, and when the arm is swung over against the stop 34 the heater is turned off. Obviously this diagrammatic showing may be considered as indicative of whatever devices are necessary to control the particular type of heater used, such as dampers, drafts, fuel supply, and the like.

The arm 32 is held up against one or the other of its stops by means of a tension spring 35 similar in function to the spring 17 hereinbefore referred to, and it is swung from one to another position by a slidable core 36 having a slotted connection with the arm 32 and controlled by the solenoids 37 and 38, respectively, connected in series with battery sections 39 and 40 by means of a common conductor 41 and separate conductors 42 and 43. The arrangement is similar to that above described in connection with the control of the valve 14, and it will be understood that whenever conductor 41 is brought in connection with conductor 42 the arm 32 will be swung against stop 33 and, in like manner, when conductor 41 is brought into connection with the conductor 43 the arm 32 will be swung over against the stop 34.

In the interior of the building, as above the floor 2, is positioned a thermostat 44 responsive to the temperature of the room in which it is placed and controlling the contact member 45. When the temperature becomes deficient, the contact member 45 is swung over into engagement with an adjustable contact 46 completing the circuit through the solenoid 37 and causing the arm 32 to swing over into the position shown in full lines and increase the action of the heater 27. On the other hand, if the temperature becomes excessive, the thermostat 44 swings arm 45 into engagement with the adjustable stop 47 energizing solenoid 38 and causing the arm 32 to turn off the heater 27 and acting through apparatus 29 to lower the temperature of the room.

The contact member 45 does not snap over from one position to the other but assumes a position proportional to the temperature and accordingly the temperature at which the heater is turned on or turned off depends upon the position of the contacts 46 and 47. These contacts are mounted upon a swinging member 48 pivoted as at 62. Although contacts 46 and 47 are adjustably mounted upon this member to be set for action at any desired temperature, nevertheless it is intended that at certain hours they shall occupy one position and at certain other hours another position. For example, assume that at eleven o'clock at night it is desired that the thermostat 44 control to maintain the temperature within the building at a relatively low point until, for example, five o'clock in the morning when it is to be set automatically to maintain the temperature at such higher degree as will be comfortable throughout the day. This can be brought about by a bodily swinging of the member 48 for a short distance to the left at eleven o'clock at night and a return to its original position at five o'clock in the morning. The hours, obviously, may be varied to suit. The means for bringing this about are diagrammatically indicated by the mechanism 49 which is assumed to swing about the center 50 and by a frictional engagement at 51 with the swinging member 48 to move the latter correspondingly. This mechanism is clockwork actuated and is so arranged that at certain predetermined hours the part 49 swings in one direction and at certain other predetermined hours returns to normal position. It is unnecessary to show in detail the mechanism whereby this is done as it is well known and is shown, for example, in United States Patent to Myer No. 1,175,976, granted March 21, 1916. It may be assumed that the part 49 corresponds in the above patent to the part 40 and to include the parts by which the above action is brought about.

This part 49 actuates or carries a flexible contact member 52 which in its travel brushes past contacts 53 and 54. These contacts are respectively connected to the conductors 26 and 25 and respectively provided with insulating parts 55 and 56 which project above their upper ends as shown in the drawings. When the flexible member 52 swings toward the right as shown in Fig. 1 of the drawing, it brushes over the insulating part 55 and snaps past the contact 53 without engaging the same but does engage contact 54 before reaching its position of rest 57 indicated in dotted lines. When the contact moves in the reverse direction by reversal of the above action, it makes temporary engagement with the contact 53. With the parts in the position shown in the drawing, the contact 53 obviously has been the last one engaged, thus resulting in energization of the solenoid 21 and the water being maintained at the proper high temperature in the tank 1. At night, however, beginning, for example, at eleven o'clock, after which hour it may be assumed that it is unnecessary to maintain the water hot, the contact 52 is swung toward the right by the mechanism above described thus making temporary engagement with the contact 54, energizing solenoid 20, and, as hereinbefore set forth, closing the valve 14. With the parts in such position, although the pilot flame 11 is maintained in action, nevertheless the burner 7 has no gas supply and waste of gas throughout the night in maintaining the water in tank 1 at a high temperature is avoided. At such hour in the morning as it becomes desirable to have hot water available, assuming it to be desired at a time similar to that at which heat is wanted in the house, the contact 52 is swung back to the position shown in full lines, the heat is turned on, and the automatic hot water system resumes operations.

Instead of turning off the gas to the main burner of the hot water heater, valve 14 may be omitted but the thermostat varied in adjustment or rendered inoperative. Means for doing this are indicated in Fig. 2 of the drawing. The thermostat 10 is connected with the valve 9 by means of a member 58 which has interposed therein a spring 59 of such stiffness that it ordinarily acts as a rigid connection. This connector 58 is provided with a locking projection 60 adapted to coact with a spring-pressed latch 61 on the end of the core 18 which may be considered identical in movement and in control with this core as shown in Fig. 1. When the core 18 is attracted by the solenoid 21 in Fig. 2, it is drawn down into inoperative position, but when it is attracted by the solenoid 20 it is raised up so as to bring the latch 61 in operative relation to the latch 60. With the parts in this position any opening of the valve 9 is prevented. If it happens to be open at the time that the core 18 moves upwardly, it will on closing snap past the latch 61 thus locking it in closed position. With the parts so disposed any action of the thermostat 10 is ineffective by reason of the spring 59 or equivalent device.

Thus, with the mechanism last above described, the automatic hot water heater is rendered inoperative during the night hours by preventing the thermostat from opening the valve 9.

It will thus be seen that without the use of additional controlling means the temperature of the hot water supply is cut down automatically at such hours as hot water is not ordinarily required with a corresponding large economy in the use of gas. Without apparatus of this sort the main burner 7 is intermittently turned on throughout the night keeping the unused water supply at the same temperature as during the day. Here, however, there is a conjoint control of the heating agency of the building and of the temperature of the hot water supply resulting in a simple and practical way in substantial economy and obviating the necessity for attention to or manual actuation of the parts.

As various possible changes might be made in the construction herein described and as the invention might be embodied in various other forms of apparatus, it is to be understood that all matter hereinbefore described or set forth in the accompanying drawings is to be interpreted as illustrative and not in a limiting sense.

I claim as my invention:

1. In a controlling system for heating agencies, in combination, heating apparatus for the interior of a building, a source of hot water supply, means connected with said source of supply to distribute hot water within said building, heating apparatus adapted to heat said source of water supply, means adapted automatically to regulate the heating action of each of said heating apparatus, and a single controlling apparatus connected with the regulating means of both of said heating apparatus and adapted simultaneously to affect the regulating action of each of them.

2. In a controlling system for heating agencies, in combination, heating apparatus for the interior of a building, a source of hot water supply, means connected with said source of supply to distribute hot water within said building, heating apparatus adapted to heat said source of water supply, controlling apparatus connected with each of said heating apparatus, and adapted to control their heating action, and clock-controlled means adapted at predetermined times simultaneously to lessen and thereafter to increase the heating effect of each of said heating apparatus.

3. In a controlling system for heating agencies, in combination, heating apparatus for the interior of a building, a source of hot water supply, means connected with said source of supply to distribute hot water within said building, heating apparatus adapted to heat said source of water supply, thermostatic means controlling the temperature of water in said source of supply, thermostatic means controlling the action of said first heating apparatus, and a single controlling apparatus adapted to affect the action of each of said thermostatic means.

4. In a controlling system for heating agencies, in combination, heating apparatus for the interior of a building, a source of hot water supply, means connected with said source of supply to distribute hot water within said building, heating apparatus adapted to heat said source of water supply, thermostatic means controlling the temperature of water in said source of supply, thermostatic means controlling the action of said first heating apparatus, and a single controlling apparatus adapted to affect the action of each of said thermostatic means, said controlling apparatus comprising clock-controlled mechanism adapted alternately to cause both of said heating apparatus to give less heat and thereafter to give more heat.

5. In a controlling system for heating agencies, in combination, a source of hot water supply, means adapted to distribute said water within a building, a heating burner adapted to heat the water of said source of supply, a pilot burner adapted to ignite said heating burner, a source of gas supply for both of said burners, thermostatic means controlling the flow of gas to said heating burner, time-controlled means adapted at predetermined times to impede the supply of gas to said heating burner without affecting said pilot burner and at other predetermined times to render inoperative said impeding means, heating apparatus for said building, and thermostatic controlling means for said heating apparatus, said last thermostatic means being connected with and controlled by said time-controlled means.

In testimony whereof, I have signed my name to this specification this 6th day of May, 1927.

ROBERT S. BLAIR.